US007971955B2

(12) United States Patent
Nillesen

(10) Patent No.: US 7,971,955 B2
(45) Date of Patent: Jul. 5, 2011

(54) METHOD AND CONTROL UNIT FOR CONTROLLING THE POWER SUPPLIED TO A PLURALITY OF HEAT SOURCES IN A PRINTER

(75) Inventor: Martijn E. Nillesen, Velden (NL)

(73) Assignee: OCE-Technologies B.V., Venlo (NL)

( * ) Notice: Subject to any disclaimer, the term of this patent is extended or adjusted under 35 U.S.C. 154(b) by 574 days.

(21) Appl. No.: 12/081,180

(22) Filed: Apr. 11, 2008

(65) Prior Publication Data

US 2008/0253794 A1 Oct. 16, 2008

(30) Foreign Application Priority Data

Apr. 13, 2007 (EP) .................................... 07106130

(51) Int. Cl.
*B41J 29/38* (2006.01)
*B41J 2/175* (2006.01)
*G01D 11/00* (2006.01)

(52) U.S. Cl. ......... 347/17; 347/5; 347/6; 347/9; 347/10; 347/11; 347/14; 347/19; 347/88; 347/99

(58) Field of Classification Search .................... 347/11, 347/14, 17, 88, 99
See application file for complete search history.

(56) References Cited

U.S. PATENT DOCUMENTS

| | | | | |
|---|---|---|---|---|
| 4,920,252 | A | 4/1990 | Yoshino | |
| 5,276,468 | A * | 1/1994 | Deur et al. | 347/17 |
| 5,992,991 | A * | 11/1999 | Kanemoto et al. | 347/88 |
| 6,178,299 | B1 * | 1/2001 | Kim | 399/88 |
| 2002/0027131 | A1 * | 3/2002 | Kitada | 219/486 |
| 2003/0128267 | A1 * | 7/2003 | Teung et al. | 347/112 |

FOREIGN PATENT DOCUMENTS

| | | | |
|---|---|---|---|
| EP | 0 987 605 | A2 | 3/2000 |
| EP | 1 184 768 | A2 | 3/2002 |
| EP | 1 679 572 | A1 | 7/2006 |
| JP | 6-4003 | A | 1/1994 |
| JP | 2006-79055 | A | 3/2006 |

* cited by examiner

*Primary Examiner* — Ryan Lepisto
(74) *Attorney, Agent, or Firm* — Birch, Stewart, Kolasch & Birch, LLP

(57) ABSTRACT

A control unit for a printing apparatus has a plurality of heat sources, each heat source being operable at an individual power level. The control unit is configured to control the power supplied to the heat sources such that, at each instant, the sum of the delivered individual power levels is less than or equal to a maximum allowable power. The control unit is also configured to control the power delivered to the heat sources on the basis of sequential cycles and for each cycle, to receive for each heat source a requested power pulse duration, to schedule within the cycle instants at which power is to be delivered to the heat sources, based on the individual power levels and requested pulse durations and to deliver the power according to the scheduled instants within the cycle.

8 Claims, 5 Drawing Sheets

METHOD AND CONTROL UNIT FOR CONTROLLING THE POWER SUPPLIED TO A PLURALITY OF HEAT SOURCES IN A PRINTER

CROSS-REFERENCE TO RELATED APPLICATIONS

This application claims priority under 35 U.S.C. §119(a) to Application No. 07106130.3, filed in Europe on Apr. 13, 2007, the entirety of which is expressly incorporated herein by reference.

BACKGROUND OF THE INVENTION

1. Field of the Invention

The present invention relates to a control unit for a printing apparatus having a plurality of heat sources, each heat source being operable at an individual power level. The control unit is adapted to control the power supplied to the heat sources such that, at each instant, the sum of the delivered individual power levels is less than or equal to a maximum allowable power. The present invention also relates to a printing apparatus comprising a control unit of this type.

2. Description of Background Art

Such a control unit may be applied in a printing system in which several sub-parts require heating. Heat sources, such as resistors are provided in the vicinity of the sub-parts to be heated and have to be supplied with electrical power (i.e. electrical current). Advantageously, many heat sources are connected to the same power supply unit. The control unit may be applied in an ink jet printing system, for example a hot melt ink jet printer.

A control unit of the type described above is known from EP 0987605. The heaters are divided in two groups, so that the power consumptions of the two groups are about the same. The power supply controller controls the power supplied to the heater of the first group throughout a first time. During the first time, when the temperature of the object heated by the heater of the first group falls below a preset lower limit temperature, power is supplied to the heater of the first group. When the temperature of the object heated by the heater of the first group reaches the preset upper limit temperature, the power supply is disconnected from the heater of the first group. These events may be repeated throughout the first time. After the first time has passed, the switch for the heater of the first group is turned off. The power supply controller then controls the power supplied to the heaters of the second group throughout a second time. After the second time has passed, the power supply to the heater of the first group is controlled again throughout the first time.

A drawback of the control unit according to EP 0987605 is that the temperature of the objects heated by the heaters of either group fluctuates considerably during time if they contain less thermal mass, since the controller is based on a hysteresis control principle. When the known controller is incorporated in an ink jet printing system, this may lead to inconsistent print results in time. Relatively large fluctuations of the temperature of the ink have a particularly negative impact on print results. Furthermore, the heaters have to be divided in fixed groups. Therefore, the proposed algorithm dynamically allocates power to the heaters.

SUMMARY OF THE INVENTION

An object of the present invention is to improve the control unit according to the background art, so that a fine temperature regulation is enabled.

This object is achieved by a control unit adapted to control the power delivered to the heat sources on the basis of sequential cycles, and for each cycle, to receive for each heat source a requested power pulse duration, to schedule within said cycle instants at which power is to be delivered to the heat sources, based on the individual power levels and requested pulse durations, and to deliver within said cycle the power according to the scheduled instants.

Due to the scheduled scheme, which may change for every new cycle, power can be delivered during each cycle to the heat sources by taking into account a requested power pulse duration for each heat source. This enables a fine temperature regulation. This in turn enables constant print results in time.

The present invention further relates to a method for controlling the power supplied to a plurality of heat sources, wherein each heat source is operable at an individual power level, the method comprising delivering power to the heat sources such that, at each instant, the sum of the delivered individual power levels is less than or equal to a maximum allowable power.

The method of the present invention solves the problem of relatively large temperature variations over time arising in a system controlled according to the method of the EP 0987605 document.

A fine temperature regulation is enabled by a method comprising delivering power to the heat sources on the basis of sequential cycles and for each cycle, receiving for each heat source a requested power pulse duration, scheduling within said cycle instants at which power is to be delivered to the heat sources, based on the individual power levels and requested pulse durations, and delivering within said cycle the power according to the scheduled instants.

With the method according to the present invention, a plurality of heating elements may be fed efficiently with a single power supply unit. The power supply unit is not necessarily able to deliver sufficient power to all heating elements simultaneously. Therefore, the moments at which each heating element is to be fed are determined by a so-called scheduler, which ensures that the total supplied power does not exceed the maximum allowable power.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
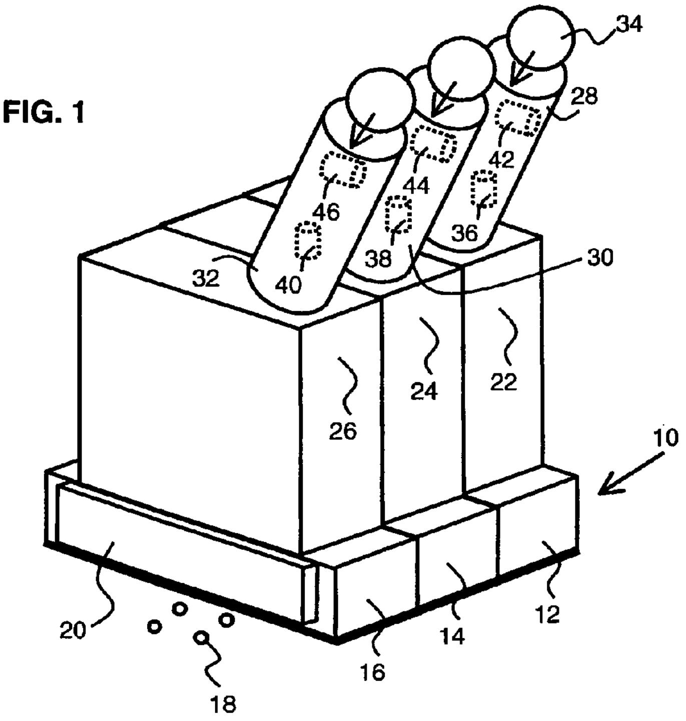
FIG. 1 is a schematic view of a print head of an ink jet printing system.

The present invention will now be described with reference to the accompanying drawings, wherein the same reference numerals have been used to identify the same or similar elements throughout the several views.

FIG. 1 is a schematic view of a print head 10 comprising three channel blocks 12, 14 and 16 (one for each of the colors cyan, magenta and yellow). The print head 10 may be mounted on a carriage of an ink jet printer so as to reciprocate in a main scan direction across a recording medium. Each channel block has an array of ink channels and a linear array of nozzles through which droplets 18 are ejected onto the recording medium (not shown) in accordance with image signals supplied to the print head. On a side of each channel block, an actuator block 20 is firmly attached thereto for causing the ejection of ink droplets. Above each one of the three channel blocks 12, 14 and 16, an ink reservoir, respectively 22, 24 and 26 is provided. Each one of the ink reservoirs 22, 24 and 26 is connected to a melting unit, respectively 28, 30 and 32 which is configured for melting hot melt ink and transferring the melted ink to the corresponding reservoir. Hot melt ink is fed to the melting units in solid form, e.g. as ink pellets 34. The ink is then heated and melted by means of the heating elements, respectively 42, 44 and 46 to a temperature of about 130° C. Each one of the heating elements 42, 44 and 46 is connected to a driver element comprising a switch for switching on or off the current supplied by a power supply unit to the heating element so as to control the temperature of the ink in the melting unit. Temperature sensors 36, 38 and 40 are located in the melting units 28, 30 and 32 so as to detect the temperature at which the ink is supplied to the reservoirs. Each one of the temperature sensors 36, 38 and 40 is arranged for transmitting temperature signals indicative of the temperature of the ink in the respective melting unit to a PID controller (proportional-integral-derivative controller) arranged in a control unit as described hereinafter.

Figure 2:
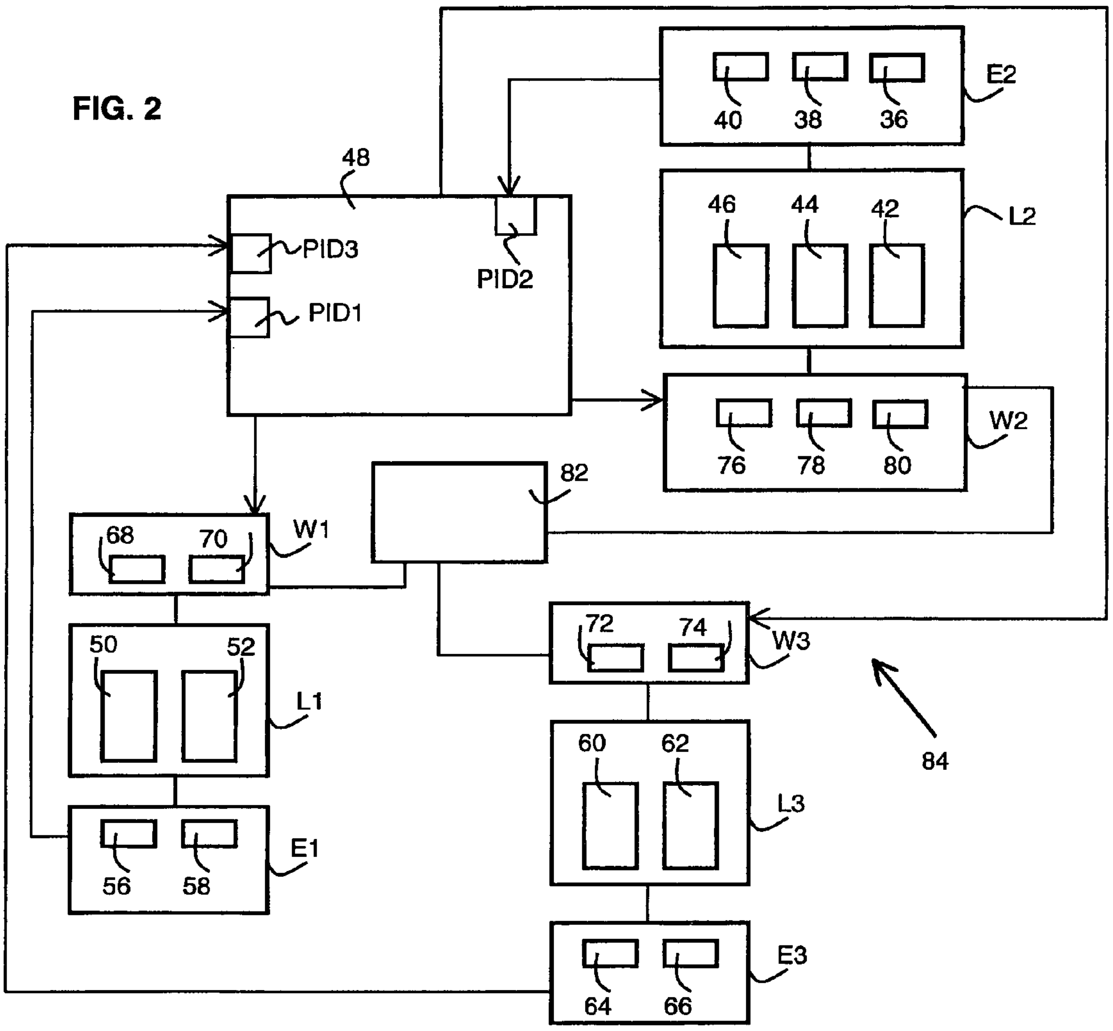
FIG. 2 is a diagrammatic view of a temperature control system with a control unit according to an embodiment of the present invention.

The power supplied to the heating elements is controlled by a control unit 48, which is part of a temperature control system 84 that will now be described in conjunction with FIG. 2.

Electrical power is supplied to the heating elements 42, 44 and 46 (e.g. resistors) in the melting units by means of a power supply unit 82, which is for example a DC voltage source. The power that can be drawn from the power supply unit is limited to the maximum allowable power value. Each one of the heating elements 42, 44 and 46 is connected via a driver element comprising a switch, respectively 80, 78 and 76 to the power supply unit 82. The switches are suitable for switching on or off the current supplied by the power supply unit 82 to the associated heaters. The state of the switches 80, 78 and 76 is controlled by the control unit 48, which is suitable for transmitting electrical signals to the switches for causing them to be open or closed. Each one of the outputs of the temperature sensors 36, 38 and 40 is connected to the control unit 48 and is arranged for transmitting to the control unit 48 a signal indicative of the measured temperature of the ink in the respective melting unit. The temperature signals are used by the control unit 48 for regulating the power supplied to the heating elements 42, 44 and 46. For the sake of simplicity, it is now assumed that the heating elements 42, 44 and 46 form a single heat source L2 connected via a single switching element W2 to the power supply unit 82 and that the temperature sensors 36, 38 and 40 are arranged to form a single temperature sensor E2 for transmitting a single temperature signal TEMP2 to the control unit 48 via a proportional-integral-derivative controller PID 2. However, it is understood that the heating elements 42, 44 and 46 could be driven individually via their respective switches 80, 78 and 76, in accordance with temperature signals transmitted to the control unit 48 by their own temperature sensors, respectively 36, 38 and 40. It is assumed that the operating power level of the heat source L2 has a value equal to P2. It is further assumed that P2 is equal to 50% of the maximum allowable power.

The droplets of molten ink that are jetted out from the nozzles of the print head 10 have a temperature of 100° C. or more and cool down and solidify after they have been deposited on the recording medium, e.g. a sheet of paper. During the image forming process, the temperature of the paper sheet should not be too low, because otherwise the ink droplets on the sheet would be cooled too rapidly and would not have enough time to spread out. For this reason, the sheet has to be heated by heating elements (e.g. resistors) 50 and 52 arranged in the vicinity of a sheet support plate (not shown). Temperature sensors 56 and 58 are provided in the vicinity of the sheet support plate and are arranged for sensing the temperature of the sheet support plate. Each one of the heaters 50 and 52 is connected via a driver element comprising a switch, respectively 68 and 70 to the power supply unit 82. The state (open or closed) of the switches 68 and 70 is controlled by the control unit 48. Each one of the outputs of the temperature sensors 56 and 58 is connected to the control unit 48 and is arranged for transmitting to the control unit 48 a signal indicative of the measured temperature. These temperature signals are used for regulating the power supplied to the heating elements 50 and 52. For the sake of simplicity, it is now assumed that the heating elements 50 and 52 form a single heat source L1 connected via a single switching element W1 to the power supply unit 82 and that the temperature sensors 56 and 58 are arranged to form a single temperature sensor E1 for transmitting a single temperature signal TEMP1 to the control unit 48 via a proportional-integral-derivative controller PID 1. However, it is understood that heating elements 50 and 52 could be driven individually via their respective switches 68 and 70, in accordance with temperature signals transmitted to the control unit 48 by the temperature sensors, respectively 56 and 58. It is assumed that the operating power level of the heat source L1 has a value equal to P1. It is further assumed that P1 is equal to 30% of the maximum available power.

The recording medium (e.g. a paper sheet) may be supplied from a paper roll to the sheet support plate. In order to regulate the humidity degree of the paper reaching the sheet support plate, the paper is pre-heated while it is still on the paper roll (not shown). To this end, two heating elements 60 and 62 are arranged in the vicinity of the paper roll. Temperature sensors 64 and 66 are provided in the vicinity of the paper roll and are arranged for sensing the temperature of the paper on the roll. Each one of the heating elements 60 and 62 is connected via a driver element comprising a switch, respectively 72 and 74 to the power supply unit 82. The state (open or closed) of the switches 72 and 74 is controlled by the control unit 48. Each one of the outputs of the temperature sensors 64 and 66 is connected to the control unit 48 and is arranged for transmitting to the control unit 48 a signal indicative of the measured temperature. These temperature signals are used for regulating the power supplied to the heating elements 60 and 62. For the sake of simplicity, it is now assumed that the heaters 60 and 62 form a single heat source L3 connected via a single switching element W3 to the power supply unit 82 and that the temperature sensors 64 and 66 are arranged to form a single temperature sensor E3 for transmitting a single temperature signal TEMP3 to the control unit 48 via a proportional-integral-derivative controller PID 3. However, it is understood that heating elements 60 and 62 could be driven individually via their respective switches 72 and 74, in accordance with temperature signals transmitted to the control unit 48 by the temperature sensors, respectively 64 and 66. It is assumed that the operating power level of the heat source L3 has a value equal to P3. It is further assumed that P3 is equal to 40% of the maximum available power.

The electronic switches 68, 70, 72, 74, 76, 78 and 80 are, e.g. transistors (MOSFET or IGBT or the like). The control unit 48 is adapted to control the states (open/closed) of said switches so as to control the power supplied to the heat sources. It is assumed that the switches are functionally grouped as switches W1, W2 and W3 (see FIG. 2), and therefore, in the rest of the description, it is assumed that the control unit 48 is adapted to control the states of the switches W1, W2 and W3.

Figure 3:
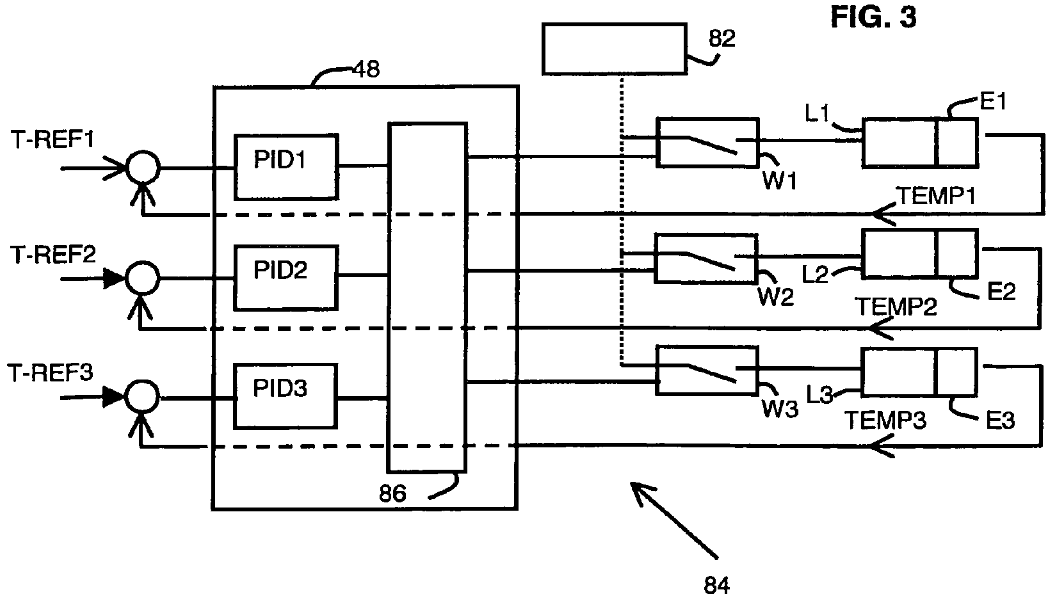
FIG. 3 is a functional view of the temperature control system.

The temperature control system 84 is represented functionally in FIG. 3. The control unit 48 may be implemented as part of the control unit of the printing apparatus. The control unit 48 comprises a central processing unit (CPU), a hard disk, a random access memory (RAM), three derivative-integral-derivative (PID) controllers PID1, PID2 and PID3, and a so-called scheduler 86. The CPU, hard disk, RAM are not shown in FIG. 3 and are arranged in a conventional way. The CPU controls the respective sub-units of the control unit 48 in accordance with control programs stored on the hard disk, such as computer programs required to execute processes to be described later. Data stored on the hard disk are read out onto the RAM by the CPU as needed, whereby the RAM has an area for temporarily storing programs and data and a work area which is used by the CPU to execute various processes.

The control unit 48 comprises three PID controllers which may be implemented as a software component. Alternately, the PID controllers could be replaced by controllers of the type P, PD, PI or the like. Each one of the PID1, PID2 and PID3 acts as a common feedback loop component. The temperature reference signals for controlling the temperature of the entities heated by the heaters L1, L2 and L3 are designated by T-REF1, T-REF2 and T-REF3. These temperatures represent the target temperatures of, respectively, the sheet support plate, the ink contained in the melting units and the paper on the paper roll, as explained above. The measured temperatures of the respective entities are fed to the PID controllers of the control unit 48 as temperature signals TEMP1, TEMP2 and TEMP3. The controller PID2 receives a value TEMP2 of the measured temperature of the ink in the melting unit and compares it with T-REF2 which is the reference setpoint value. The difference between T-REF2 and TEMP2 constitutes an error signal which is adjusted by the controller PID2 to adjust the requested pulse duration for the power to be delivered to the heat source L2. The other PID controllers (PID1 and PID3) operate in a similar way.

The scheduler 86, which may be implemented as a software component, performs tasks which are described hereinafter, wherein reference is made to FIGS. 4A, 4B, 4C, 4D and 5. The method for controlling the power supplied to a plurality of heat sources according to an embodiment of the present invention comprises some of the steps shown in FIG. 5. The control unit 48 is configured for controlling the power delivered to the heat sources on the basis of sequential cycles. The control unit 48 controls the states of the switches W1, W2 and W3 so as to control the instants at which power is delivered to the heat sources L1, L2 and L3.

Figure 4A:
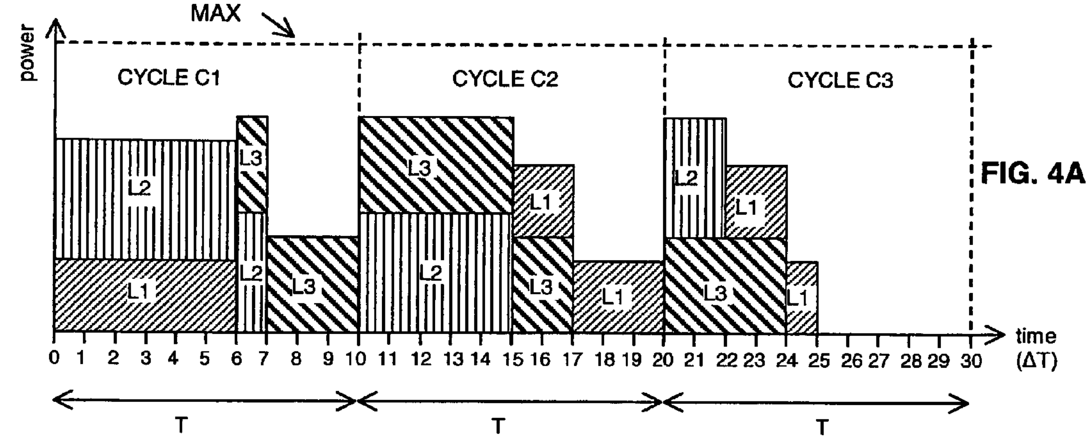
FIGS. 4A to 4D show three cycles, wherein the power supplied to each heat source is represented as a function of time.
Figure 4B:
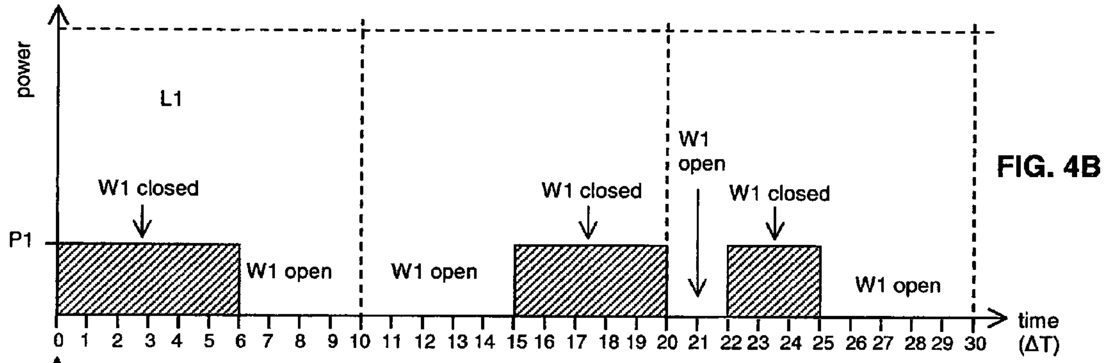
Figure 4C:
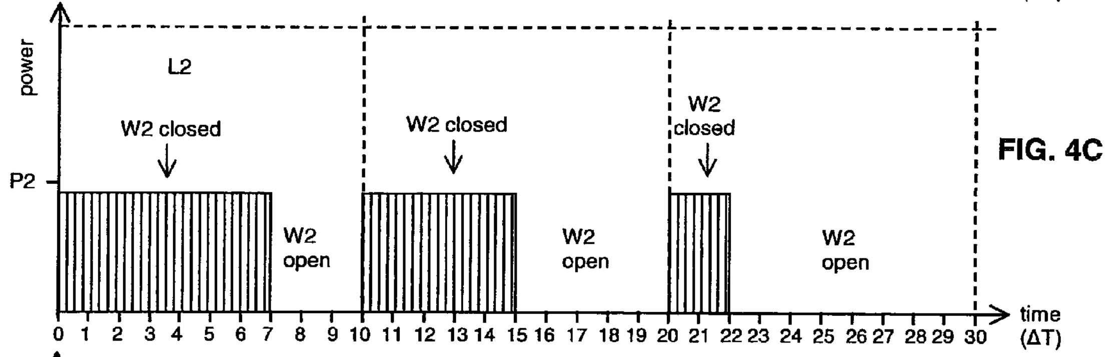
Figure 4D:
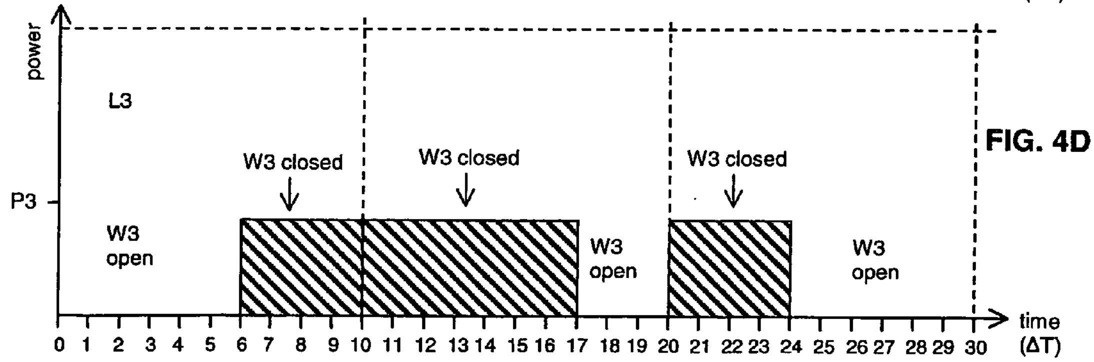
Figure 5:
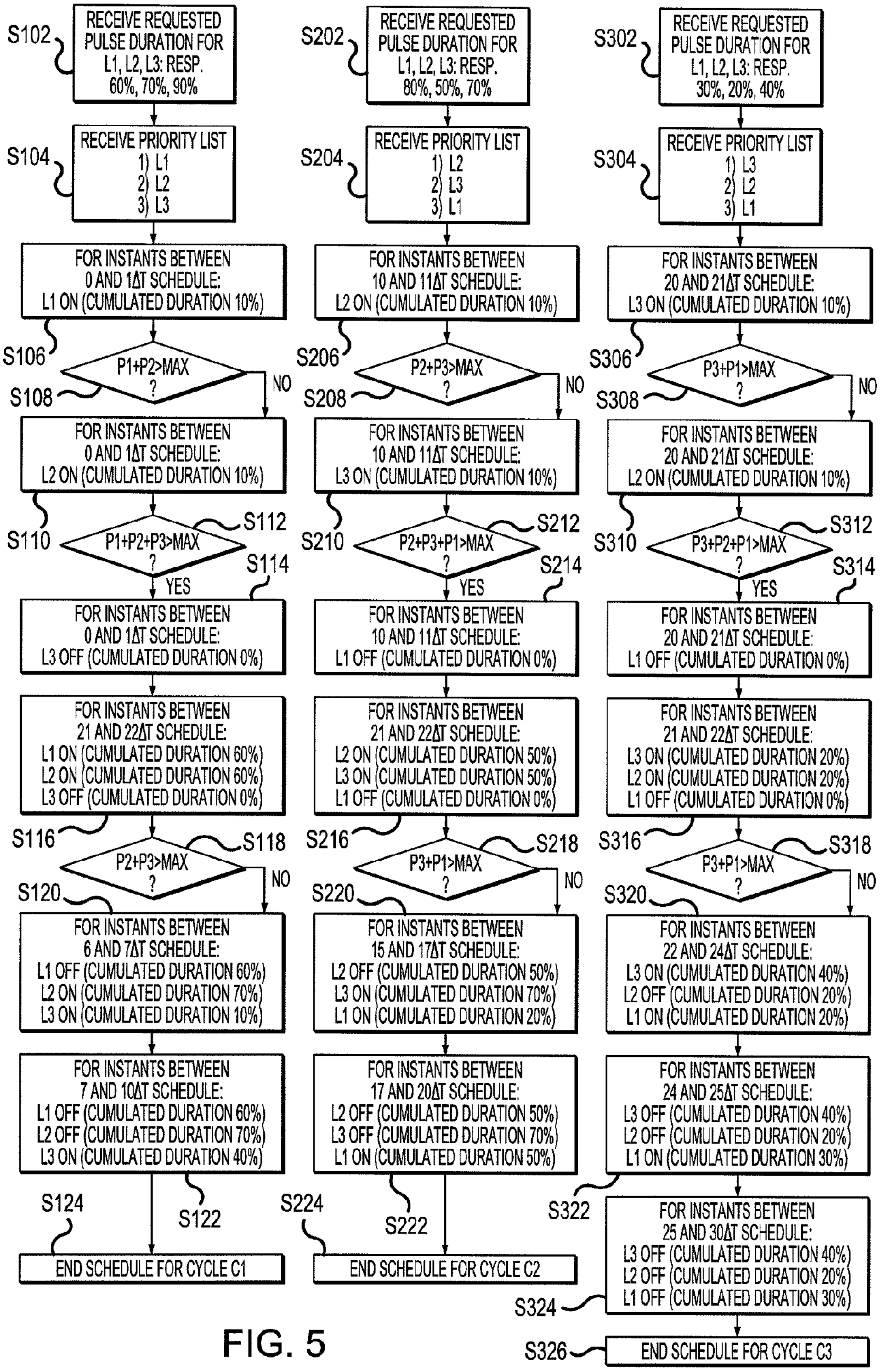
FIG. 5 is a flow chart representing steps of the method according to an embodiment of the present invention

The steps shown in FIG. 5 are executed by the scheduler 86 and enable the scheduling of the instants at which power is to be delivered to the heat sources L1, L2 and L3, for three cycles serving as an example only: CYCLE C1, CYCLE C2 and CYCLE C3. The resulted scheduled instants at which power is to be delivered to the heat sources L1, L2 and L3 are illustrated in FIG. 4A, which represents the amount of power to be delivered to the heat sources as a function of time. In FIG. 4A, three cycles are represented, each of said cycles having a period T, which is equal to the sampling period of the real-time temperature control system 84. It is assumed that the period T of each cycle is discretely divided in, e.g. 10 time units, wherein a time unit has the value ΔT. For example, T is equal to 1 s (one second) and ΔT is thus equal to 0.1 s (100 milliseconds). ΔT represents the accuracy of the regulating system. It is further assumed that the operating power values for the heat sources L1, L2 and L3 are, respectively, P1, P2 and P3. As indicated above, the values of P1, P2 and P3 reach, respectively, 30%, 50% and 40% of the maximum allowable power.

It is assumed that CYCLE C1 starts at the instant 0, as is shown in FIG. 4A. Just before power is actually delivered to the heat sources L1, L2 and L3 for this cycle, an algorithm routine is executed by the scheduler 86 for scheduling the instants at which power is to be delivered to the heat sources. The time required for executing this routine is very small compared to ΔT and can be neglected in the present description. Therefore, it is considered that the algorithm routine executed by the scheduler 86 for scheduling the instants at which power is to be delivered during CYCLE C1 is executed at the instant 0 and quasi-immediately delivers the resulting schedule for said cycle. The algorithm for scheduling the instants at which power is to be delivered during first cycle (CYCLE C1) comprises the steps S102 to S124, as shown on the left column in FIG. 5. Steps S102 to S124 are now described in detail hereunder.

In step S102, the requested pulse durations for each one of the heat sources L1, L2 and L3 are received. The values of the requested durations are transmitted by the PID controllers PID1, PID2 and PID3 to the scheduler 86 based on the temperature information supplied by temperature sensors C1, C2 and C3. The requested power pulse durations are expressed in the form of a duty cycle ratio. For example, the requested power pulse duration for the heat source L1 is the duty cycle ratio 60%, indicating that that the PID controller requests a duration equal to 0.6 T, i.e. 6ΔT to the scheduler 86. The requested durations are 70% (i.e. 7ΔT) for heat source L2 and 90% (i.e. 9ΔT) for heat source L3.

In step S104, the scheduler 86 receives or determines itself the priority order for the heat sources L1, L2 and L3. The priority list may be fixed, or may change at the beginning of every cycle. In the example for CYCLE C1, the priority order is the following: L1, L2 and L3. In the case that the priority order is fixed, it is received from a memory installed on the control unit 48. On the other hand, if the priority order may change at the beginning of every cycle, it is calculated by the scheduler 86 according to pre-defined rules. An example of such rules will now be described.

If it is detected at a certain moment that an ink pellet is fed to any of the melting units 28, 30 or 32, the heat source L2 (representative of the heating elements 42, 44 and 46 in the melting units) is attributed the highest priority for the next cycle. Other rules are possible, related for example to the amount of paper supplied from the paper roll. If paper has to be supplied at a high speed, the heat source L3 (representing the heaters 60 and 62 of the paper pre-heating arrangement) is attributed the highest priority. Alternately, the heat source L1 (representing the heating elements 50 and 52 of the sheet support plate heating system) could be attributed the highest priority, if the rate of ink deposition is high. The order of priority may change between cycles.

In step S106, the scheduler allocates power P1 to the heat source L1 for the instants between 0 and 1ΔT. Since the heat source L1 has the highest priority range, it has to be supplied from the beginning of the CYCLE C1. Then, in step S108, a test is carried out to determine whether adding the power P2 for the heat source L2 to the power P1 for the heat source L1 would lead to supplying power above the value of the maximum allowable power. Since the sum P1+P2 is less than MAX, the value of maximum allowable power, the result of the test in step S108 is NO. Therefore, in the next step S110, the scheduler allocates power P2 to the heat source L2 for the instants between 0 and 1ΔT.

Then, in step S112, a test is carried out to determine whether adding the power P3 for the heat source L3 to the sum (P1+P2) would lead to supplying power above the value of the maximum allowable power. Since the sum P1+P2+P3 is more than the value of the maximum allowable power, the result of the test in step S112 is YES. Therefore, in the next step S114, the scheduler does not allocate any power to the heat source L3 for the instants between 0 and 1ΔT. Finally, for the instants between 0 and 1ΔT, the schedule is the following: L1 'ON', L2 'ON' and L3 'OFF', as illustrated in FIG. 4A. At the instant 1ΔT, the heat sources L1 and L2 each cumulates 10% of the total duty cycle.

Since a duty cycle ratio of 60% is requested for the heat source L1, the situation between the instants 1ΔT and 6ΔT remains the same as between 0 and 1ΔT, as is determined in step S116 by the scheduler. Hence, for the instants between 1ΔT and 6ΔT, the schedule is the following: L1 'ON', L2 'ON' and L3 'OFF', as illustrated in FIG. 4A. At the instant 6ΔT, the heat sources L1 and L2 each cumulates 60% of the total duty cycle. For the heat source L1, the cumulated 'ON' duration is equal to the requested power pulse duration. Therefore, for the remainder of CYCLE C1, the heat source L1 is turned off.

Since L1 is scheduled to be turned off at the instant 6ΔT, power becomes available for other heat sources. In step S118, a test is carried out to determine whether adding the power P3 for the heat source L3 to the power P2 for the heat source L2 would lead to supplying power above the value of the maximum allowable power. Since the sum P2+P3 is less than the value MAX of maximum allowable power, the result of the test in step S118 is NO. Therefore, in the next step S120, the scheduler allocates for the instants between 6ΔT and 7ΔT power P2 to the heat source L2 and power P3 to the heat source L3, as illustrated in FIG. 4A. At the instant 7ΔT, the heat source L2 cumulates 70% of the duty cycle and the heat source L3 cumulates 10% of the duty cycle. For the heat source L2, the cumulated 'ON' duration is equal to the requested power pulse duration. Therefore, for the remainder of CYCLE C1, the heat source L2 is turned off.

In step S122, the scheduler allocates for the instants between 7ΔT and 10ΔT power P3 to the heat source L3 as illustrated in FIG. 4A. At the instant 10ΔT, the heat source L3 cumulates 40% of the duty cycle. This is less than the requested power pulse duration, which was 90%. However, for the CYCLE C1, all the instants have been utilized. The heat source L3, having the lowest priority, receives a power pulse having a duration less than the required duration.

Since all instants for the CYCLE C1 are scheduled, in step S124, the scheduler 86 finalizes the schedule for said cycle. Immediately upon finalizing the schedule for the CYCLE C1, the control unit 48 transmits signals to the switches W1, W2 and W3 to control their states (open/closed) over time in accordance with the calculated schedule (ON/OFF) for the CYCLE C1. Power is thus actually delivered to the heat sources L1, L2 and L3 during the first cycle C1 as calculated by the scheduler 86. On the left part of FIGS. 4B, 4C and 4D, the power pulses respectively delivered to the heat sources L1, L2 and L3 are represented for the first cycle C1.

Then, the algorithm for scheduling the instants at which power is to be delivered during the second cycle (CYCLE C2) is executed and comprises the steps S202 to S224, as shown on the middle column in FIG. 5. Steps S202 to S224 will now be briefly explained.

In step S202, the requested pulse durations for each one of the heat sources L1, L2 and L3 are received. The requested power pulse durations for the heat source L1, L2 and L3 are respectively duty cycle ratio 80% (equal to 8ΔT), 50% (equal to 5ΔT) and 70% (equal to 7ΔT).

In step S204, the scheduler 86 determines or examines the priority order for the heat sources L1, L2 and L3. For CYCLE C2, the priority order is the following: L2, L3 and L1.

In step S206, the scheduler 86 allocates power P2 to the heat source L2 for the instants between 10 and 11ΔT. Then, in step S208, a test is carried out to determine whether adding the power P3 for the heat source L3 to the power P2 for the heat source L2 would lead to supplying power above the value of the maximum allowable power. The result of the test in step S208 is NO. Therefore, in the next step S210, the scheduler 86 allocates power P3 to the heat source L3 for the instants between 10 and 11ΔT.

Then, in step S212, a test is carried out to determine whether adding the power P1 of heat source L1 to the sum (P2+P3) would lead to supplying power above the value of the maximum allowable power. The result of the test in step S212 is YES and therefore, in the next step S214, the scheduler 86 does not allocate any power to the heat source L1 for the instants between 10 and 11ΔT. Finally, for the instants between 10 and 11ΔT, the schedule is the following: L2 'ON', L3 'ON' and L1 'OFF', as illustrated in FIG. 4A.

Since a duty cycle ratio of 50% is requested for the heat source L2, the situation between the instants 11ΔT and 15ΔT remains the same as between 10 and 11ΔT, as is determined in step S216 by the scheduler. Hence, for the instants between 11ΔT and 15ΔT, the schedule is the following: L2 'ON', L3 'ON' and L1 'OFF', as illustrated in FIG. 4A. Then, for the remainder of CYCLE C2, the heat source L2 is turned off.

In step S218, a test is carried out to determine whether adding the power P1 for heat source L1 to the power P3 for the heat source L3 would lead to supplying power above the value of the maximum allowable power. The result of the test in step S218 is NO. Therefore, in the next step S220, the scheduler allocates for the instants between 15ΔT and 17ΔT power P3 to the heat source L3 and power P1 to the heat source L1, as illustrated in FIG. 4A. Then, for the remainder of CYCLE C2, the heat source L3 is turned off.

In step S222, the scheduler 86 allocates for the instants between 17ΔT and 20ΔT power P1 to the heat source L1 as illustrated in FIG. 4A. At the instant 20ΔT, the heat source L1 cumulates 50% of the duty cycle. This is less than the requested power pulse duration, which was 70%. However, for the CYCLE C2, all the instants have been utilized. The heat source L1, having the lowest priority, receives a power pulse having a duration less than the required duration.

Since all instants for the CYCLE C2 are scheduled, in step S224, the scheduler closes the schedule for said cycle. Immediately upon closing the schedule for the CYCLE C2, the control unit 48 transmits signals to the switches W1, W2 and W3 to control their states (open or closed) in accordance with the calculated schedule for the CYCLE C2. Power is thus delivered to the heat sources L1, L2 and L3 during the second cycle in accordance with the calculated schedule (ON/OFF) for the CYCLE C2. Power is thus actually delivered to the heat sources L1, L2 and L3 during the second cycle C2 as calculated by the scheduler 86. In the central part of FIGS. 4B, 4C and 4D, the power pulses respectively delivered to the heat sources L1, L2 and L3 are represented for the cycle C2.

Then, the algorithm for scheduling the instants at which power is to be delivered during the third cycle (CYCLE C3) is executed and comprises the steps S302 to S326, as shown on the right column in FIG. 5. Steps S302 to S326 will now be briefly explained.

In step S302, the requested pulse durations for each one of the heat sources L1, L2 and L3 are received from the PID controllers. It is assumed that the requested power pulse durations for the heat source L1, L2 and L3 are, respectively, duty cycle ratio 30% (equal to 3ΔT), 20% (equal to 2ΔT) and 40% (equal to 4ΔT).

In step S304, the scheduler 86 determines or receives the priority order for the heat sources L1, L2 and L3. For CYCLE C3, the priority order is the following: L3, L2 and L1.

In step S306, the scheduler 86 allocates power P3 to the heat source L3 for the instants between 20 and 21ΔT. Then, in step S308, a test is carried out to determine whether adding the power P2 for the heat source L2 to the power P3 for the heat source L3 would lead to supplying power above the value of the maximum allowable power. The result of the test in step S308 is NO. Therefore, in the next step S310, the scheduler 86 allocates power P2 to the heat source L2 for the instants between 20 and 21ΔT.

Then, in step S312, a test is carried out to determine whether adding the power P1 for heat source L1 to the sum (P3+P2) would lead to supplying power above the value of the maximum allowable power. The result of the test in step S312 is YES. Therefore, in the next step S314, the scheduler 86 does not allocate any power to the heat source L1 for the instants between 20 and 21ΔT. Finally, for the instants between 20 and 21ΔT, the schedule is the following: L2 'ON', L3 'ON' and L1 'OFF', as illustrated in FIG. 4A.

Since a duty cycle ratio of 20% is requested for the heat source L2, the situation between the instants 21ΔT and 22ΔT remains the same as between 20 and 21ΔT, as is determined in step S316 by the scheduler. Hence, for the instants between 21ΔT and 22ΔT, the schedule is the following: L3 'ON', L2 'ON' and L1 'OFF', as illustrated in FIG. 4A. Then, for the remainder of CYCLE C3, the heat source L2 is turned off.

In step S318, a test is carried out to determine whether adding the power P1 for the heat source L1 to the power P3 for the heat source L3 would lead to supplying power above the value of the maximum allowable power. The result of the test in step S318 is NO. Therefore, in the next step S320, the scheduler 86 allocates for the instants between 22ΔT and 24ΔT power P3 to the heat source L3 and power P1 to the heat source L1, as illustrated in FIG. 4A. Then, for the remainder of CYCLE C3, the heat source L3 is turned off.

In step S322, the scheduler 86 allocates for the instants between 24ΔT and 25ΔT power P1 to the heat source L1 as illustrated in FIG. 4A. At the instant 25ΔT, the heat sources L1, L2 and L3 each cumulates the required power pulse duration Therefore, in step S324, the scheduler 86 schedules the heat sources L1, L2 and L3 to be turned off between 25 and 30ΔT. In the example taken for the cycle C3, all heat sources are to be fed with power having a pulse duration equal to the required duration.

In step S326, the scheduler 86 finalizes the schedule for the third cycle C3. Immediately upon finalizing the schedule for the CYCLE C3, the control unit 48 transmits signals to the switches W1, W2 and W3 to control their states (open or closed) in accordance with the calculated schedule for the CYCLE C3. Power is thus actually delivered to the heat sources L1, L2 and L3 during the third cycle C3 at the instants calculated by the scheduler 86. In the right part of FIGS. 4B, 4C and 4D, the power pulses respectively delivered to the heat sources L1, L2 and L3 are represented for the cycle C3.

Figure 6A:
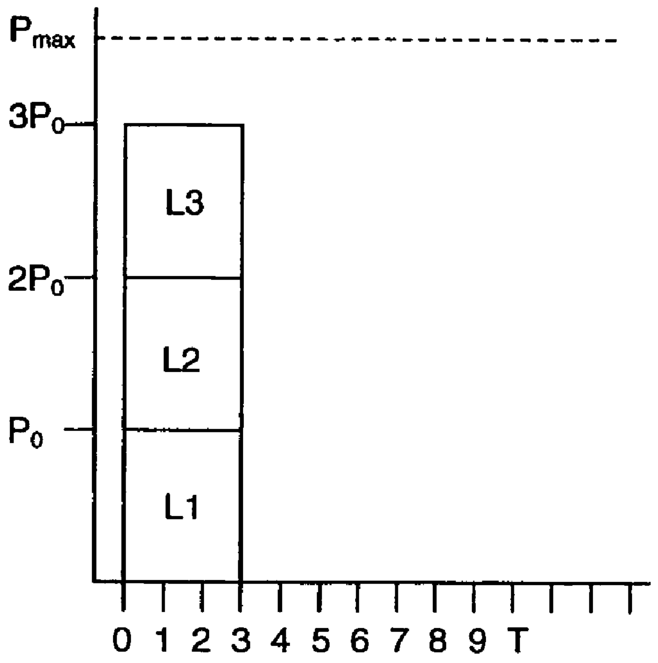
FIGS. 6A and 6B are diagrams for illustrating an advantageous embodiment of the present invention.
Figure 6B:
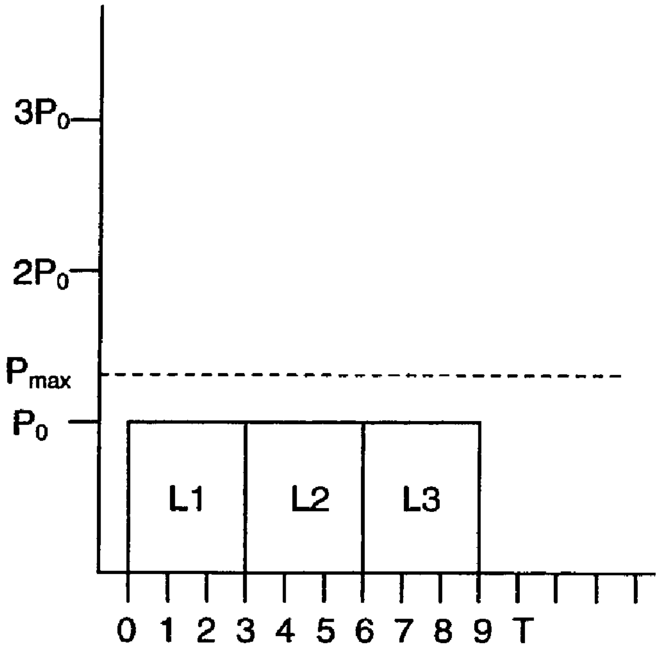

It is understood that, in normal operation, a great number of cycles are executed in order to control the instants at which power is delivered to the heat sources. In an embodiment of the present invention, the maximum allowable power may be considered to have a constant value, e.g. based on a rated power of a power supply unit. If the maximum allowable power is relatively high compared to the power requested by the heat sources, a relatively high current may be generated by the power supply unit in a first period of each cycle such that the requested power is delivered to the heat sources in said first period, whereas in a second period of the cycle, the generated current may be low, possibly even zero, since the power has been delivered in the first period. The high current; however, results in relatively high losses in any cables from the power supply unit to the heat sources, since the losses are proportional to the square of the current. Therefore, in a further embodiment, the maximum allowable power may be set in response to a sum of power requested by the heat sources. FIGS. 6A and 6B illustrate such an embodiment.

FIGS. 6A and 6B each show a time diagram representing a single cycle, in which three heat sources L1, L2, L3 request power. For ease of explanation it is considered that the three heat sources L1, L2, L3 each have the same rated power $P_0$ and they each request such power during a time interval of three time units (see FIGS. 4A-4D). The cycle period is indicated by T (see FIGS. 4A-4D). Further, it is assumed, as an example, that the power supply unit is suitable for generating and supplying $3P_0$ by supplying $3I_0$, $I_0$ being the current to be supplied to each heat source for outputting the rated power $P_0$. The vertical axis of the time diagram of FIG. 6 shows the power supplied by the power supply unit. As mentioned above, this power is proportional to the current I supplied to the heat sources L1, L2, L3.

FIG. 6A illustrates a first embodiment using the rated power of the power supply unit as a constant value of the maximum allowable power $P_{max}$. Since the three heat sources L1, L2, L3 each request power $P_0$ during a time interval of three time units (3t), the power supply unit supplies during the three time units a corresponding current of $3I_0$. Consequently, a cable loss during the three time units is proportional to $(3I_0)^2$ which is equal to $9(I_0)^2$. Thus, the total cable losses during the cycle period T is proportional to $3t.9.(I_0)^2$ which equals $27.t.(I_0)^2$.

FIG. 6B illustrates a second embodiment in which the maximum allowable power is adjustable and may be set per cycle, for example. In particular, at a start of the cycle, a total requested power times the time interval during which such power is requested may be determined by a control unit. Based on the outcome of such determination, a maximum allowable power may be determined such that the power to be supplied during the cycle is substantially constant, or at least a minimum variation in current occurs during the cycle (low RMS), thereby reducing power loss in the cables and providing a good EMC performance.

If desired or required, the maximum allowable power may be increased with a predetermined value for overhead. Further, a minimum value may be applicable, for example if one of the heat sources has a higher rated power than the determined maximum allowable power. If the maximum allowable power would be lower than the rated power of one of the heat sources, such a heat source could not be provided with the requested power anymore.

Now turning to FIG. 6B, at the start of the cycle, it is determined that the heat sources L1, L2, L3 request in total a power of $P_0$ during a total of 9 time units. Hence, an average requested power during this cycle equals $\frac{9}{10}$ $P_0$. A minimum power is; however, $P_0$ in order that it is enabled to power each of the heat sources. Further, in order to enable some overhead, a predetermined power of 0.3 $P_0$ is added to the minimum value. Consequently, for this cycle, a maximum allowable power $P_{max}$ is determined to be equal to 1.3 $P_0$. Now, based on this maximum allowable power $P_{max}$, the heat sources L1, L2, L3 are operated sequentially, instead of at the same time. As a result, the cable losses are proportional to 9 $(I_0)^2$, which is three times lower than in the first embodiment of FIG. 6A.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control unit for a printing apparatus, the printing apparatus having a plurality of heat sources, each of the plurality of heat sources being operable at an individual power level, the control unit comprising a scheduler;

the control unit being configured to control the power supplied to the plurality of heat sources such that, at each instant, the sum of the delivered individual power levels to the plurality of heat sources is less than or equal to a maximum allowable power level; and the control unit being configured to control the power delivered to the plurality of heat sources on the basis of scheduled instants within sequential cycles, and for each of said sequential cycles:

the schedule receiving a requested power pulse duration for each of the plurality of heat sources;

the schedule scheduling for each instant within said sequential cycle to which of the plurality of heat sources the power is to be delivered, based on the individual power levels of the plurality of heat sources and the requested power pulse durations; and the control unit being configured to deliver the power according to the scheduled instants within said sequential cycle.

2. The control unit according to claim 1, wherein the schedule receives a priority list specifying a rank of priority for each of the plurality of heat sources and schedules for each instant within said sequential cycles to which of the plurality of heat sources the power is to be delivered, further based on the priority list.

3. The control unit according to claim 1, further comprising a feedback loop component for determining a power pulse duration to be requested for each of the plurality of heat source based on an error signal, the error signal being the difference between a sensed temperature and a reference temperature.

4. The control unit according to claim 1, wherein the printing apparatus is a hot melt inkjet printing apparatus.

5. A printing apparatus, comprising:

a plurality of heat sources, each heat source being operable at an individual power level by a power supply unit;

a temperature sensor that senses the temperature of an object supplied by each heat source, comprising a control unit, the control unit comprising a scheduler;

the control unit being configured to control the power supplied to the plurality of heat sources such that, at each instant, the sum of the delivered individual power levels to the plurality of heat sources is less than or equal to a maximum allowable power level; and the control unit being configured to control the power delivered to the plurality of heat sources on the basis of scheduled instants within sequential cycles, and for each of said sequential cycles:

the schedule receiving a requested power pulse duration for each of the plurality of heat sources;

the schedule scheduling for each instant within said sequential cycle to which of the plurality of heat sources the power is to be delivered, based on the individual power levels of the plurality of heat sources and the requested power pulse durations; and the control unit being configured to deliver the power according to the scheduled instants within said sequential cycle.

6. The printing apparatus according to claim 5, wherein at least one of the plurality of heat sources is a heating element for a melting unit of a hot melt print head.

7. The printing apparatus according to claim 5, wherein the maximum allowable power level is adjustable.

8. The printing apparatus according to claim 5, wherein the printing apparatus is a hot melt inkjet printing apparatus.

* * * * *